US010246235B2

(12) United States Patent
Sebald et al.

(10) Patent No.: US 10,246,235 B2
(45) Date of Patent: Apr. 2, 2019

(54) PACKAGING FILM

(71) Applicant: INFIANA GERMANY GMBH & CO. KG, Forchheim (DE)

(72) Inventors: Ingrid Sebald, Lauf an der Pegnitz (DE); Werner Schmidt, Forchheim (DE); Felix Grimm, Erlangen (DE)

(73) Assignee: INFIANA GERMANY GMBH & CO. KG, Forchheim (DE)

( * ) Notice: Subject to any disclaimer, the term of this patent is extended or adjusted under 35 U.S.C. 154(b) by 3 days.

(21) Appl. No.: 15/264,948

(22) Filed: Sep. 14, 2016

(65) Prior Publication Data

US 2017/0001420 A1 Jan. 5, 2017

Related U.S. Application Data

(63) Continuation of application No. PCT/EP2015/000610, filed on Mar. 19, 2015.

(30) Foreign Application Priority Data

Mar. 21, 2014 (DE) .......... 10 2014 004 042
Mar. 21, 2014 (DE) .......... 10 2014 010 691
Jul. 29, 2014 (DE) .......... 10 2014 010 986

(51) Int. Cl.
| | |
|---|---|
| *B32B 27/08* | (2006.01) |
| *B65D 65/14* | (2006.01) |
| *B32B 27/32* | (2006.01) |
| *B32B 38/06* | (2006.01) |
| *B32B 1/08* | (2006.01) |
| *B65D 65/00* | (2006.01) |
| *B32B 1/00* | (2006.01) |
| *B32B 3/30* | (2006.01) |
| *B32B 7/06* | (2019.01) |
| *B32B 7/12* | (2006.01) |
| *B29C 47/00* | (2006.01) |
| *B29C 47/06* | (2006.01) |
| *B65D 33/00* | (2006.01) |
| *B32B 37/04* | (2006.01) |
| *B32B 37/12* | (2006.01) |
| *B32B 37/14* | (2006.01) |
| *B29K 101/12* | (2006.01) |
| *B29L 31/00* | (2006.01) |

(52) U.S. Cl.
CPC .......... *B65D 65/14* (2013.01); *B29C 47/0057* (2013.01); *B29C 47/0061* (2013.01); *B29C 47/06* (2013.01); *B32B 1/00* (2013.01); *B32B 1/08* (2013.01); *B32B 3/30* (2013.01); *B32B 7/06* (2013.01); *B32B 7/12* (2013.01); *B32B 27/08* (2013.01); *B32B 27/32* (2013.01); *B32B 38/06* (2013.01); *B65D 33/007* (2013.01); *B65D 65/00* (2013.01); *B29K 2101/12* (2013.01); *B29L 2031/7128* (2013.01); *B32B 37/04* (2013.01); *B32B 37/12* (2013.01); *B32B 2037/148* (2013.01); *B32B 2250/24* (2013.01); *B32B 2250/242* (2013.01); *B32B 2255/10* (2013.01); *B32B 2255/26* (2013.01); *B32B 2307/514* (2013.01); *B32B 2307/516* (2013.01); *B32B 2307/544* (2013.01); *B32B 2307/5825* (2013.01); *B32B 2307/7242* (2013.01); *B32B 2307/7244* (2013.01); *B32B 2307/7246* (2013.01); *B32B 2307/7248* (2013.01); *B32B 2307/748* (2013.01); *B32B 2439/46* (2013.01); *B32B 2553/00* (2013.01); *B32B 2555/00* (2013.01)

(58) Field of Classification Search
CPC ....... B32B 1/00; B32B 1/08; B32B 2037/148; B32B 2250/24; B32B 2250/242; B32B 2255/10; B32B 2255/26; B32B 2307/514; B32B 2307/516; B32B 2307/544; B32B 2307/5825; B32B 2307/7242; B32B 2307/7244

See application file for complete search history.

(56) References Cited

U.S. PATENT DOCUMENTS

| | | |
|---|---|---|
| 5,024,799 A | 6/1991 | Harp et al. |
| 8,361,580 B2 | 1/2013 | Stark et al. |
| 2008/0113133 A1* | 5/2008 | Fackler ............... B29C 47/0021 428/35.7 |
| 2009/0208718 A1 | 8/2009 | Stoll et al. |
| 2010/0009156 A1 | 1/2010 | Daviknes et al. |
| 2011/0083765 A1 | 4/2011 | Stark et al. |
| 2012/0189862 A1 | 7/2012 | Kitada et al. |

(Continued)

FOREIGN PATENT DOCUMENTS

| | | |
|---|---|---|
| CN | 1458880 A | 11/2003 |
| CN | 1733397 A | 2/2006 |

(Continued)

OTHER PUBLICATIONS

Melvin I. Kohan, Nylon Plastics Handbook Cover, Chapter 13 Commercial Nylon Plastics and Their Applications, pp. 486-599, Carl Hanser Verlag Munich, 1995.

German Search Report for DE 10 2014 010 691.8 dated Nov. 6, 2014.

Kunststoff-Handbuch vol. VI, Polyamide, Carl Hanser Verlag Munich, 1966.

Kunststoff-handbuch vol. 3/1—technische Thermoplaste: Polycarbonate, Polyacetale, Polyester, Celluloseester; Carl Hanser Verlag, 1992.

(Continued)

*Primary Examiner* — Lawrence D Ferguson

(74) *Attorney, Agent, or Firm* — Norris McLaughlin, P.A.

(57) ABSTRACT

A packaging film made of an at least monoaxially stretched, multi-layered plastic film comprised of at least up to 50% by weight of polyolefins and having a total thickness ≤18 μm, which has an expansion of up to a maximum of 1% at a tensile force of at least 3N per 25 mm width according to DIN EN ISO 527.3

15 Claims, No Drawings

(56) References Cited

U.S. PATENT DOCUMENTS

2013/0118128 A1    5/2013  Luecke et al.
2013/0266751 A1  10/2013  Schneider et al.
2014/0335293 A1  11/2014  Schuhmann et al.

FOREIGN PATENT DOCUMENTS

| DE | 10 2010 042342 A1 | 4/2012 |
|----|-------------------|--------|
| DE | 102011121143 A1   | 2/2013 |
| EA | 200900660 A1      | 12/2009 |
| EP | 1 279 494 A1      | 1/2003 |
| EP | 2471859 A1        | 7/2012 |
| JP | 06-031879 A       | 2/1994 |
| JP | H10315404 A       | 12/1998 |
| JP | 11-300911 A       | 11/1999 |
| JP | 2002-127324 A     | 5/2002 |
| WO | 9311938 A1        | 6/1993 |
| WO | 2006/063208 A2    | 6/2006 |
| WO | 2010/075946 A1    | 7/2010 |
| WO | 2011/054434 A1    | 5/2011 |
| WO | 2013/026544 A1    | 2/2013 |

OTHER PUBLICATIONS

Melvin I. Kohan, Nylon Plastics Handbook, Carl Hanser Verlag Munich, 1995.

* cited by examiner

PACKAGING FILM

This application is a Continuation of International Patent Application No. PCT/EP2015/000610, filed Mar. 19, 2015, which claims foreign priority benefit under 35 U.S.C. § 119 of German Patent Applications 10 2014 004 042.9 filed Mar. 21, 2014, 10 2014 010 691.8 filed Mar. 21, 2014, and 10 2014 010 986.0 filed Jul. 29, 2014 the contents of all of which are incorporated herein by reference.

BACKGROUND OF THE INVENTION

The present invention relates to a packaging film comprising an at least monoaxially oriented, multilayered, flexible polymeric film having a total thickness ≤18 µm, preferably ≤12 µm, which has an elongation of up to at most 1% under a tensile force of at least 3 N per 25 mm width in accordance with DIN EN ISO 527-3, and to packaging produced therefrom for preferably individually packaged hygiene products or individually packaged incontinence products.

It is known that polymeric films are used for numerous applications, of which the use of polymeric films as packaging material adds up to a considerable proportion of the total use. Accordingly, in particular in the hygiene sector an increasing trend can be recognized for packaging hygiene articles for single use, since increasingly hygiene articles, such as panty liners or sanitary towels but also incontinence articles, are packaged individually. Therefore, there is increasing demand for corresponding packaging material for these articles as well. Since such packaging material is barely recyclable and cannot be used for any repeated use, attempts are also increasing to use as few fossil resources as possible for the provision of these packaging materials too. This means that for the production of such polymeric films as packaging material, as little as possible of the polymers obtained from fossil raw material should be used, but without at the same time causing impacts on the vital quality requirements of such polymeric films, particularly on their mechanical properties, their barrier properties, and on other necessary physical properties.

In order to save polymer material in the production of polymeric films, it is obvious first of all to reduce the total thickness of a multilayer polymeric film of this kind. Since, however, this usual approach can cause in some cases a drastic reduction of the mechanical properties of such polymeric film, such as of its tensile stress, its tear resistance, and where relevant of its puncture resistance, which has not only adverse effects on the handling on the polymeric film during further processing to the end product, but may also cause disruptions of the production. Accordingly, such possibility for saving on material creates inconsiderable risks. Moreover, in the case of the application of a release coating on polymeric films with only a total layer thickness of ≤20 µm, difficulties may also occur.

It was an object of the present invention, therefore, to provide a packaging film based on a flexible polymeric film which in spite of having a reduced total film thickness of below 20 µm having excellent mechanical properties guarantying undisrupted processing.

SUMMARY OF THE INVENTION

This object is achieved by the provision of a packaging film which comprises an at least monoaxially oriented, multilayer polymeric film having a total thickness of ≤18 µm, preferably ≤12 µm, more particularly from 5 µm to ≤12 µm and which has an elongation of up to at most 1% under a tensile force of at least 3 N per 25 mm width, preferably 3 N up to 5 N, per 25 mm width in accordance with DIN ISO 527-3.

DETAILED DESCRIPTION

Preferably the packaging film of the invention consists only of a multilayer polymeric film having a total thickness of ≤18 µm, preferably ≤12 µm, more particularly from 5 µm to ≤12 µm, which is characterized by the fact that it has an at least monoaxial orientation in machine direction of at least 1:2, preferably of at least 1:3, more preferably from 1:3 to 1:5, and an elongation of up to at most 1% under a tensile force of at least 3 N per 25 mm width, preferably 3 N up to 5 N, per 25 mm width in accordance with DIN ISO 527-3.

Optionally the inventively used polymeric film may also be biaxially oriented, which means it could also have orientation transverse to the machine direction of 1:2 to 1:3.5. In the case of biaxial orientation, i.e., orientation both in machine direction and transversely to the machine direction, the orientation ratio in these two directions may be different, in which case preferably the orientation in machine direction is higher than transversely to the machine direction.

The polymeric film employed in accordance with the invention is a multilayer film having preferably at least three layers, more preferably at least five layers. In other preferred embodiments the polymeric film may even have 7 to 11 layers.

The multilayer polymeric film employed in accordance with the invention preferably comprises a layer sequence of at least five layers composed of the following polymer layers:

(a) an optionally sealable layer (a) as surface layer,
(b) an adhesion promoter layer (b),
(c) a layer (c), optionally with barrier effect,
(d) an adhesion promoter layer (d), and
(e) an optionally sealable layer (e) as surface layer.

The layers of the inventive polymeric film used as packaging film are preferably produced of thermoplastic polymers selected from the group comprising polyolefins, polyamides, polyesters, biodegradable polymers, copolymers of at least two monomers of the mentioned polymers and mixtures of at least two of the mentioned polymers.

Preferably, the inventive polymeric film as packaging film consists of at least 50 wt %, more preferably of at least 70 wt % of polyolefins, preferably of $C_2$-$C_8$ olefin polymers, more preferably of $C_2$-$C_3$ olefin polymers, their mixtures or copolymers, and is characterized by the features mentioned before such as thickness, orientation and elongation.

The polymeric film used according to the invention does not comprise cyclic olefin polymers or copolymers.

Preferably, the layers (a) and (e) and, optionally also the layer (c) of the polymeric film used according to the invention are based, in each case identically or differently, on polyolefins and olefin copolymers of $\alpha,\beta$-unsaturated olefins having 2-8, preferably 2-3, carbon atoms, which are preferably selected from the group comprising polyethylenes (PE), preferably polyethylenes with a low density between 0.86 and 0.93 g/cm³ (LDPE), linear polyethylenes with a low density between 0.86 and 0.94 g/cm³ (LLDPE), which as LLDPE include as comonomer contain one or more α-olefins having more than 2 carbon atoms, polyethylenes with a medium density between 0.926 and 0.94 g/cm³ (MDPE), polyethylenes with a high density between 0.94 and 0.97 g/cm³ (HDPE), copolymers of ethylene and an α-olefin having 4 or more carbon atoms (mPE); polypropylenes (PP), polyisobutylenes (PI), polybutylenes (PB) and ethylene-propylene copolymers with preferably 1-10 mol % of ethylene (EPC).

Particular preferably a mixture of LDPE and MDPE or a mixture of LDPE, MDPE and PP can be used for producing the layers (a), (e) and optionally (c) in which case the fraction of MDPE and optionally PP in the mixture can amount in each case to 25 wt % to 85 wt %, based on the total weight of the respective layer.

The layers (a) and (e) can also be made up of olefin/vinylcarboxylic acid copolymers or olefin/vinyl ester copolymers such as ethylene-acrylic acid copolymers (EAA), their esters such as (EMA), ethylene-methacrylic acid copolymers (EMAA), their esters such as (EMMA), ethylene-vinyl acetate copolymers with preferably 60-99 mol % of ethylene (EVA), or of mixtures of in each case at least two of the afore-mentioned types of polymers.

According to a further embodiment, at least the layer (e) as surface layer may be based on at least one polyester or at least one copolyester which is preferably selected from the group comprising polyethylene terephthalates (PET, c-PET, a-PET) and copolymers such as coPET, PBT, and coPBT). "PET" refers to polyethylene terephthalates which have been prepared by polycondensation of ethylene glycol and terephthalic acid. It is also possible to use amorphous PET (a-PET) and crystalline PET (c-PET). "coPET" refers to copolyesters of ethylene glycol and terephthalic acid further including other monomers, such as branched or aromatic diols, for example. "coPBT" refers to polybutylene terephthalates. Preferably, the polyester or copolyester used have an intrinsic viscosity of preferably 0.1 to 2.0 dl/g, more preferably of 0.3 to 1.5 dl/g, more particularly of 0.6 to 1.0 dl/g, the methods for determining the intrinsic viscosity being known to a person skilled in the art. A comprehensive description of suitable PET and PBT is disclosed in Kunststoffhandbuch Volume 3/1—technische Thermoplaste: Polycarbonate, Polyacetale, Polyester, Celluloseester; Carl Hanser Verlag, 1992, the content of which is hereby referenced in full.

In a further embodiment, at least the layer (e) may be based on at least one biodegradable polymer. Suitable biodegradable thermoplastic polymers are at least one biodegradable polymer selected from the group comprising lactic acid homopolymers and copolymers, preferably polylactides, more preferably DL-lactide, L-lactide and D-lactide polymers, polyhydroxyalkanoates, cellulose, cellulose derivatives, thermoplastic starch, polyesters, preferably polycaprolactones, polyethers, at least partly hydrolyzed polyvinyl acetates, ethylene-vinyl alcohol copolymers and copolymers of at least two monomers of the mentioned polymers.

In a further preferred embodiment, the polymeric film employed as packaging film in accordance with the invention has at least one layer (c) with a barrier effect. The person skilled in the art is aware of suitable polymers which provide a barrier effect, particularly against loss of gas or loss of aroma, against migration of low molecular weight components and/or against impaired taste or impaired odor, or against moisture and/or against oils and fats.

The layer (c) with a barrier effect against gases, preferably against $O_2$, $H_2O$ vapor or loss of aroma, against migration of low molecular weight components and/or against impaired taste or impaired odor, is based on at least one thermoplastic polymer selected from the group comprising ethylene-vinyl alcohol copolymers, polyvinyl alcohols, polyvinylidene chlorides, vinylidene chloride copolymers, polyether-poly- amide block copolymers and mixtures of the polymers with ethylene-vinyl acetate copolymers. Preferred vinylidene chloride copolymers have a vinylidene chloride fraction of 80% or more. Ethylene-vinyl alcohol copolymers are particularly preferred.

According to another preferred embodiment, the barrier effect against moisture and/or oils and fats is achieved preferably by providing a layer (c) being based on a thermoplastic, aliphatic or (partially) aromatic polyamide or copolyamide or mixtures thereof.

For the purpose of producing at least one layer (c) it is possible to use as polyamides (PA) or copolyamides (coPA) preferably aliphatic or (partially) aromatic polyamides, preferably having a melting point in the range from 160 to 240° C., more preferably from 170 to 220° C. Preferred are aliphatic polyamides of which at least one polyamide or copolyamide selected from the group comprising PA 6, PA 12, PA 6,6, PA 6,12, PA 6/6,6, PA 6,6/6, or partially aromatic polyamides such as PA6T and PA6I. With preference it is also possible to use polyamides having isophoronediamine units. A comprehensive description of polyamides and copolyamides is found in Kunststoff-Handbuch Volume VI, Polyamide, Carl Hanser Verlag Munich, 1966; and Melvin I. Kohan, *Nylon Plastics Handbook*, Carl Hanser Verlag Munich, 1995, the content of which is hereby referenced in full.

As already mentioned, particularly useful for producing the layer (c) are homopolyamides and/or copolyamides selected from the group comprising thermoplastic, aliphatic, partially aromatic, and aromatic homopolyamides or copolyamides with isophoronediamine units. These homopolyamides or copolyamides with isophorone diamine units may be composed of further aliphatic and/or cycloaliphatic diamines having 2-10 carbon atoms such as hexamethylene diamine and/or aromatic diamines having 6-10 carbon atoms such as p-phenylene diamine, and of aliphatic or aromatic dicarboxylic acids having 6-14 carbon atoms such as adipic acid, for example, in addition to terephthalic acid and/or isophthalic acid. Furthermore, polyamides with isophorone diamine units which have been prepared using lactams having 4-10 carbon atoms such as ε-caprolactam, for example, may also be used. To produce the layer (c) it is possible with preference to use homopolyamides and/or copolyamides having isophorone diamine units, in which case copolyamides of ε-caprolactam, isophorone diamine, and an aromatic dicarboxylic acid, preferably isophthalic acid, are employed with particular preference.

In one preferred embodiment the fraction of the isophorone diamine-isophthalic acid units in the polyamide component of the layer (c) is at least 1 to 10 wt %, more preferably 2 to 6 wt %, based on the total weight of the polyamide component.

The thermoplastic polyesters recited before for the production of the layer (e) may also be used for producing the layer (c).

With the aid of the layer (c) as barrier layer it is possible and by appropriate selection of suitable polymers, for the multilayer polymeric film of the invention to have a DIN 53380-3 oxygen permeability which is significantly reduced relative to a corresponding polymeric film without barrier layer and which may amount to at most up to 10.00 $cm^3/(m^2 \cdot d \cdot bar)$ at 23° C. and 50% rh. In this case the oxygen permeability of the multilayer polymeric film employed in accordance with the invention may be reduced even further down to at most 8 $cm^3/(m^2 \cdot d \cdot bar)$, preferably at most 7 or 6 $cm^3/(m^2 \cdot d \cdot bar)$, more preferably at most 5, 4 or 3 $cm^3/(m^2 \cdot d \cdot bar)$, even more preferably at most 2, 1 or 0.5 $cm^3/$ (m²·d·bar), most preferably at most 0.4, 0.3 or 0.2 cm³/(m²·d·bar), and more particularly at most 0.1, 0.09 or 0.08 cm³/(m²·d·bar) (in each case at 23° C. and 50% rh).

With the aid of the layer (c) as barrier layer it is likewise possible and with appropriate selection of suitable polymers, to reduce the water vapor permeability of the multilayer polymeric film employed in accordance with the invention down to the values mentioned before for the oxygen permeability, the water vapor permeability being determined in accordance with DIN ISO 53 122.

Where the layer (c) functions as barrier layer (c), it is preferably connected to the adjacent layers via adhesion promoter layers (b) and (d).

Suitable thermoplastic polymers which can be used as adhesion promoter polymers are known to the person skilled in the art. The adhesion promoter layers (b) and (d), identically or differently, are based preferably on a preferably modified polyolefin and/or olefin copolymer, preferably selected from the group comprising carboxyl group-modified or cyclic anhydride group-modified polyethylenes, polypropylenes, more particularly maleic anhydride group-modified polyethylenes, polypropylenes, and ethylene-vinyl acetate copolymers. Preferred are polymers with maleic anhydride-modified PE, with COOH group-modified PE, with carboxyl group-modified copolymers of ethylene-vinyl acetate, ethylene (meth)acrylate copolymers, anhydride-modified ethylene-vinyl acetate copolymers and polymer blend comprising at least two of the afore mentioned polymers. Copolymers modified with maleic anhydride are particularly preferred.

According to one preferred embodiment the inventive packaging film consists of a polymeric film having an at least five-layer sequence composed of
(a) a layer (a) based on a mixture of polyethylenes, preferably composed of a mixture of MDPE and LDPE or of LLDPE and LDPE and optionally further fillers and auxiliaries,
(b) an adhesion promoter layer (b),
(c) a barrier layer (c) based on a polyamide, preferably an aliphatic polyamide, or a copolyamide, preferably an (partially) aromatic copolyamide,
(d) a further adhesion promoter layer (d), and
(e) another layer (e) based on a mixture of polyethylenes, preferably composed of a mixture of MDPE and LDPE or of LLDPE and LDPE.

In a further particularly preferred embodiment the multilayer polymeric film, employed as packaging film according to the invention, comprises more than one layer (c) in accordance with the following layer sequence:
(a) an optionally heat-sealable, optionally multi-ply layer (a) preferably made up of at least one thermoplastic olefin homopolymer or copolymer or mixtures thereof, which may optionally be equipped with a release layer as surface layer,
(b) an adhesion promoter layer (b),
(c) a layer (c) preferably made up of at least one homopolyamide and/or copolyamide,
(b) optionally a further adhesion promoter layer (b),
(c) a further layer (c), preferably made up of at least one homopolyamide and/or copolyamide, or ethylene-vinyl alcohol copolymer,
(d) a further adhesion promoter layer (d), and
(e) an optionally heat-sealable surface layer (e) made up of at least one thermoplastic olefin homopolymer or copolymer or mixtures thereof.

The layers (c) are based on homopolymers, copolymers or mixtures of polymers as described before, more preferably on polyamides or ethylene-vinyl alcohol copolymers. The composition of the other layers also correspond preferably to the details mentioned before in relation to these layers.

The layers of the multilayer polymeric film used in accordance with the invention may contain in each case the same or different additives selected from the group comprising antioxidants, antiblocking agents, antifog agents, antistats, active antimicrobial ingredients, light stabilizers, UV absorbers, UV filters, dyes, color pigments, stabilizers, preferably heat stabilizers, processes stabilizers, and UV and/or light stabilizers, preferably based on at least one sterically hindered amine (HALS), process assistants, flame retardants, nucleating agents, crystallizing agents, preferably crystal seed formers, lubricants, optical brighteners, plasticizers, silanes, spacers, fillers, such as CaCO3, silicates, peel additives, seal additives, waxes, wetting agents, surface-active compounds, preferably surfactants, and dispersants.

The layers of the polymeric film used in accordance with the invention may contain at least 0.01-30 wt %, preferably at least 0.1-20 wt %, in each case based on the total weight of an individual layer, of at least one of the before mentioned additives.

Neither the polymeric film nor the packaging film used according to the invention has been embossed and has an embossed structure on its surface layers.

The oriented polymeric film used as packaging film according to the invention, moreover, has excellent tensile strength, good to very good tear characteristics, and an excellent puncture resistance, with an elongation of up to at most 1% under a tensile force of at least 3 N per 25 mm width, preferably of 3 N up to 5 N per 25 mm width in accordance with DIN EN ISO 527-3.

As a result thereof, the inventive packaging film in spite of the low total layer thickness can be processed without any significant elongation on the usual packaging machines with high take-off speeds.

Furthermore, the unembossed, inventive packaging films being oriented monoaxially in machine direction, with an at least five-layer sequence comprising a barrier layer, preferably composed of one of the mentioned partially aromatic copolyamides, surprisingly exhibit a tear resistance (according to DIN 53356—trouser leg) in machine direction which is up to 50% higher than that transversely to the machine direction. Therefore, during the further processing of such films, by tearing the film in machine direction the risk of any rupturing of the film is considerably reduced and consequently the amount of reject material and the number of production disruption is considerably lowered.

The multilayer polymeric film used as packaging film in accordance with the invention may also have a release coating on one of its surface layers, to improve its release effect.

The release coating is based preferably on a cured polysiloxane coating, with which the multilayer polymeric film employed in accordance with the invention may be furnished even prior to orientation or after orientation. The release coating that generates release effect is present over substantially the whole area, preferably except for at least one stripe which extends in machine direction, or over a partial area, preferably in the form of in-register transverse stripes.

The term "polysiloxane" in the sense of the present invention refers to compounds whose polymer chains are constructed alternately of silicon atoms and oxygen atoms. A polysiloxane is based on n repeating siloxane units —[Si(R$_2$)—O]— which each independently of one another are disubstituted by two organic radicals R, with R preferably being in each case $R^1$ or $OR^1$, and with $R^1$ in each case being an alkyl radical or an aryl radical. The cured polysiloxane coating is preferably based on a repeating dialkylsiloxane unit or on a repeating alkylaryl siloxane unit. Depending on the number of Si—O bonds possessed by an individual siloxane unit, based in each case on a tetravalent silicon atom, these units may be differentiated as terminal monofunctional siloxanes (M) having one Si—O bond, difunctional siloxanes (D) having two Si—O bonds, trifunctional siloxanes (T) having three Si—O bonds, and tetra-funtional siloxanes (Q) having four Si—O bonds. The polysiloxane coating of the invention preferably has a cross-linked cyclic or catenated structure, more preferably a crosslinked catenated structure, which is linked by (D), (T) and/or (Q) units to form a two- or three-dimensional network. The number n of the repeating siloxane units $[Si(R_2)-O-]_n$ in the polysiloxane chain is termed the degree of polymerization of the polysiloxane.

The cured polysiloxane coating of the polymeric film used according to the invention is based preferably on at least one cured, i.e. crosslinked, polysiloxane selected from the group encompassing addition-crosslinked, preferably addition-crosslinked with metal catalysis, condensation-crosslinked, radically crosslinked and/or cationically crosslinked polysiloxanes.

More preferably the polysiloxane coating is based on at least one cured polysiloxane which has been cured by thermocuring and/or under the action of UV radiation. The polysiloxane coating is based preferably on at least one cured polysiloxane selected from the group encompassing polydialkyl siloxanes, preferably polydimethyl siloxanes and polyalkylaryl siloxanes, preferably polymethylphenyl siloxanes, which in each case are cured. Thermally cured polysiloxanes may be obtained by thermal hydrosililation of polysiloxanes containing silane functions, using a compound having at least one carbon double bond. UV curing takes place preferably after the orientation of the film used in accordance with the invention. Similarly, the thermocuring is carried out preferably after the orientation of the packaging film of the invention. UV curing is preferred in accordance with the invention.

The polymeric film used as packaging film in accordance with the invention can be produced in principle by any known production methods, such as by extrusion or by coextrusion, for example.

Here, both individual layers and all the layers of the polymeric film can be formed by extrusion, more particularly by blown film extrusion and/or flat film extrusion (cast extrusion), or preferably coextrusion, more particularly blown film coextrusion and/or flat film coextrusion (cast coextrusion), the latter being preferred. Here it should be ensured that in the case of adding to the layer (a) or to other layers additives, these additives are employed by blending, where appropriate as a masterbatch, with the polymer component or components of the respective layer for processing. This blending can take place dry in pellet/powder form or pellet/pellet form. An alternative possibility is for the additive to be added to the melted polymer component or components of the respective layer, preferably by metering in an extruder used for the extrusion of the layer in question.

After the coextrusion process, which is known per se, the melts corresponding to the individual layers of the film used as packaging film in accordance with the invention are coextruded simultaneously and jointly through a round die or a flat die, the resulting film is taken off for solidification on one or more rolls, and the oriented film is heat-set.

Biaxial orientation (stretching) can be carried out sequentially or simultaneously. Sequential orientation is generally carried out successively, with preference being given to the successive biaxial orientation, where orientation is performed first longitudinally (in machine direction) and transversely (perpendicularly to the machine direction). In the case of film production after flat film extrusion with subsequent monoaxial or biaxial orientation, the polymer or the polymer mixture of the individual layers is compressed in an extruder and fluidized, it being possible for any additives added to be already present in the polymer or polymer mixture. The melts are then pressed simultaneously through a flat die (slot die) and the multilayer film extruded is taken off on one or more take-off rolls at a temperature of 10 to 100° C., preferably 10 to 50° C., and it cools and solidifies.

The multilayer polymeric film used in accordance with the invention is then oriented either only longitudinally, or longitudinally and transversely to the extrusion direction, leading to orientation of the molecule chains. Longitudinal orientation is carried out preferably at a temperature of 70 to 130° C., preferably 80 to 110° C., usefully with the aid of two rolls which run at different speeds in line with the target draw ratio, and the additional transverse orientation, when practiced, is carried out preferably at a temperature of 120 to 180° C. by means of a corresponding tenter frame. The desired transverse draw ratios can be set at this point. Monoaxial Orientation in machine direction is preferred in accordance with the invention.

The orientation of the film used in accordance with the invention is followed preferably by its heat-setting (heat treatment) where the film is held for about 0.1 to 10 s at a temperature of 100 to 160° C. Subsequently, where appropriate after interim storage, the film of the invention may be furnished with any release coating present. It is also possible for the extruded multilayer polymeric film employed in accordance with the invention to be provided with any release coating even prior to orientation.

The polymeric film or packaging film used in accordance with the invention is unembossed. The packaging film consists preferably of the before-described, at least monoaxially oriented, multilayer polymeric film. These polymeric films can where appropriate be joined to other polymeric films and/or paper webs. The packaging films preferably consist only of the before-described polymeric films. The packaging films of the invention can preferably be printed.

A further object of the present invention is a packaging composed of an inventive packaging film, preferably of a polymeric film used as packaging film in accordance with the invention, preferably for adhesive articles of any kind, more preferably for self-adhesive articles of any kind, more preferably for individually packaged adhesive articles, more particularly for single use.

A further subject of the present invention is a packaging composed of the inventive packaging film, preferably of a polymeric film used as packaging film in accordance with the invention, for optionally self-adhesive hygiene articles, preferably for individually packaged, optionally folded and/or optionally self-adhesive panty liners, sanitary towels or incontinence articles, more particularly for single use.

The inventive and comparative examples thereafter serve to illustrate the invention but should not be interpreted restrictively.

I. Chemical Characterization of the Raw Materials Used

TABLE I

|  | Density | MFR (° C./kg) |
|---|---|---|
| LDPE | 0.923 | 0.75 (190° C./2.16 kg) |
| LLDPE | 0.921 | 0.9 (190° C./2.16 kg) |
| MDPE | 0.935 | 1.4 (190° C./2.16 kg) |
| PP | 0.90 | 0.95 (230° C./2.16 kg) |
| Copolyamide of isophorone diamine/isophthalic acid/ε-caprolactam with about 5 mol % isophorone diamine (IPDI-copolyamide) | 1.13 | 5 (235° C./2.16 kg) |
| AP = PE modified with maleic anhydride | 0.91 | 2.6 (190° C./2.16 kg) |
| Chalk |  | Masterbatch of LDPE with 70 wt % $CaCO_3$ |
| Colorant |  | Masterbatch of LDPE with 70 wt % $TiO_2$ |

II. Production of the Polymeric Films (B1/B2) Employed in Accordance with the Invention Each of the multilayer polymeric films with the construction and compositions reported in table II and III, respectively, was produced by coextrusion on a blown film coextrusion line, initially with a total layer thickness of 40 μm. Following flat laying of the film bubble, the film was supplied to a roll orienting unit and oriented by a factor of 1:4 in longitudinal direction, so that the resulting total film thickness was 10 μm. The physical properties reported in table IV below were determined in accordance with DIN EN ISO 527-3 on these multilayer polymeric films, and have been cited.

III. Composition of the Polymeric Films

All % figures below are weight % in each case. ps III.1 Examples B1

(3-layer, overall layer thickness 10 μm)

TABLE III

| Layer composition |
|---|
| Layer (a) |
| Layer thickness 2.5 μm |
| Layer (c) |
| Layer thickness 5 μm |
| Layer (e) |
| Layer thickness 2.5 μm |
| Unembossed |
| Monoaxially oriented |

TABLE II

| Raw material B1 |
|---|
| 30% MDPE |
| 49.5% LDPE |
| 20% Chalk |
| 0.5% Additive |
| 48.4% MDPE |
| 33.3% PP |
| 13.3% LDPE |
| 4% Colorant |
| 1% Additive |
| 30% MDPE |
| 49.5% LDPE |

TABLE II-continued

| Raw material B1 |
|---|
| 20% Chalk |
| 0.5% Additive |
| + |
| + |

III.2 Examples B2

(5-layer, total layer thickness 10 μm)

TABLE III

| Layer composition |
|---|
| Layer (a) |
| Layer thickness 2.9 μm |
| Adhesion promoter layer (b) |
| Layer thickness 0.85 μm |
| Layer (c) |
| Layer thickness 2.5 μm |
| Adhesion promoter layer (d) |
| Layer thickness 0.85 μm |
| Layer (e) |
| Layer thickness 2.9 μm |
| Unembossed |
| Monoaxially oriented |

TABLE II

| Raw material B2 |
|---|
| 54% MDPE |
| 20% LDPE |
| 15% Chalk |
| 10% Colorant |
| 1% Additive |
| 100% AP |
| 100% IPDI copolyamide |
| 100% AP |
| 54% MDPE |
| 20% LDPE |
| 15% Chalk |
| 10% Colorant |
| 1% Additive |
| + |
| + |

TABLE IV

Measurements to DIN EN ISO 527-3 (Strip width 25 mm)

| Draw ratio | Thickness | Tear force [N] | | Tear strength [N/mm$^2$] | | Tensile force [N] | Elongation [%] |
|---|---|---|---|---|---|---|---|
| MD | [μm] | MD | CD | MD | CD | MD | MD |
| Example 1 (3-layer, unembossed, monoaxially oriented) | | | | | | | |
| 1:3.8 | ≈11 | 39.2 | 5.8 | 142.5 | 21.1 | 3.9 | 13 |
|  |  |  |  |  |  |  | 0.67 |
| Example 2 (5-layer, unembossed, monoaxially oriented) | | | | | | | |
| 1:4 | 10 | 45.2 | 4.1 | 180.1 | 35.2 | 4.6 | 13 |
|  |  |  |  |  |  |  | 0.52 |

The invention claimed is:

1. A packing film comprising an unembossed multilayer polymeric film having a total thickness ≤18 μm, which is oriented at least monoaxially in machine direction to an orientation ratio of at least 1:2, which comprises at least to an extent of 50 wt % polyethylenes (PE), polypropylenes (PP), their mixtures or copolymers, which comprises a layer sequence of at least five layers composed of
a) a layer (a) as surface layer comprising a mixture of LDPE and MDPE or a mixture of LDPE, MDPE and PP,
b) an adhesion promoter layer (b),
c) a layer (c), based on a mixture of LDPE and MDPE or a mixture of LDPE, MDPE and PP or ethylene/vinyl alcohol copolymers, polyvinyl alcohols, polyamides, copolyamides, polyesters and/or polyether-polyamide block copolymers,
d) an adhesion promoter layer (d), and
e) a layer e) as surface layer comprising a mixture of LDPE and MDPE or a mixture of LDPE, MDPE and PP,
and which has an elongation of up to at most 1% under a tensile force of at least 3 N per 25 mm width in accordance with DIN EN ISO 527-3 and has no embossed structure on its surface layers.

2. A packing film as claimed in claim 1, consisting of the multilayer polymeric film.

3. A packing film as claimed in claim 1, wherein the polymeric film in machine direction has an orientation ratio of at least 1:3.

4. A packing film as claimed in claim 1, wherein the polymeric film comprises to an extent of at least 70 wt % polyethylenes (PE), polypropylenes (PP), their mixtures or copolymers.

5. A packing film as claimed in claim 4, wherein the polymeric film consists to an extent of at least 70 wt. % of LDPE, MDPE, LLDPE, polypropylenes (PP), or a mixture of at least two of said polyolefins.

6. A packing film as claimed in claim 1, wherein the polymeric film has at least one barrier layer against gasses, against fats and oils or against migration of low molecular mass organic compounds and/or against moisture.

7. A packing film as claimed in claim 6, wherein the barrier layer of the polymeric film is made up of ethylene/vinyl alcohol copolymers, polyvinyl alcohols, polyamides, copolyamides, polyesters and/or polyether-polyamide block copolymers.

8. A packing film as claimed in claim 1, wherein
the layer (a) further comprises fillers and auxiliaries, and
the layer (c) is a barrier layer based on a polyamide.

9. A packing film as claimed in claim 8, wherein the barrier layer of the polymeric film is based on an aliphatic polyamide or (partially) aromatic copolyamide.

10. A packing film as claimed in claim 9, wherein the unembossed polymeric film oriented in machine direction has a higher tear strength in machine direction than that transversely to the machine direction.

11. A packing film as claimed in claim 1, wherein the polymeric film has a release coating on at least one of its surfaces.

12. A packaging produced from a packing film of claim 1.

13. A packaging as claimed in claim 12 for individually packaged panty liners, sanitary towels or incontinence articles.

14. A packaging as claimed in claim 12 for individually packaged self-adhesive articles for single use.

15. A packaging as claimed in claim 14 for self-adhesive hygiene articles or incontinence articles.

\* \* \* \* \*